US010112481B2

(12) United States Patent
Kowalsky et al.

(10) Patent No.: US 10,112,481 B2
(45) Date of Patent: Oct. 30, 2018

(54) POWER TRANSFER UNIT (PTU) ASSEMBLY WITH CYLINDER (71) Applicant: BorgWarner Inc., Auburn Hills, MI (US)

(72) Inventors: Christopher J. Kowalsky, Windsor (CA); Jeremy L. Cradit, Grand Blanc, MI (US); John H. Rode, Swartz Creek, MI (US)

(73) Assignee: BorgWarner Inc., Auburn Hills, MI (US)

(*) Notice: Subject to any disclaimer, the term of this patent is extended or adjusted under 35 U.S.C. 154(b) by 364 days.

(21) Appl. No.: 15/139,975

(22) Filed: Apr. 27, 2016

(65) Prior Publication Data
US 2016/0318392 A1 Nov. 3, 2016

Related U.S. Application Data (60) Provisional application No. 62/153,657, filed on Apr. 28, 2015, provisional application No. 62/158,947, filed on May 8, 2015.

(51) Int. Cl.
B60K 17/346 (2006.01)
B60K 23/08 (2006.01)
B60K 17/344 (2006.01)
B60K 5/04 (2006.01)

(52) U.S. Cl.
CPC ............ B60K 23/08 (2013.01); B60K 17/344 (2013.01); *B60K 5/04* (2013.01); *B60K 2023/0833* (2013.01)

(58) Field of Classification Search
CPC .......... B60K 2023/0833; B60K 17/344; B60K 23/08
See application file for complete search history.

(56) References Cited

U.S. PATENT DOCUMENTS

| 5,342,255 | A | 8/1994 | Slesinski et al. |
| 6,202,812 | B1 | 3/2001 | Semke |
| 6,450,051 | B1 | 9/2002 | Balamuki et al. |
| 8,795,126 | B2 | 8/2014 | Downs et al. |
| 2010/0038164 | A1* | 2/2010 | Downs ................. B60K 17/348 180/248 |
| 2010/0044138 | A1* | 2/2010 | Marsh ................. B60K 17/348 180/247 |

(Continued)

Primary Examiner — Terence Boes
(74) Attorney, Agent, or Firm — Warn Partners, P.C.

(57) ABSTRACT

A power takeoff unit for an automotive vehicle being a normally front-wheel drive vehicle that is convertible to all wheel drive. The takeoff unit includes an input shaft supported in a housing, the input shaft is torsionally connected with a transmission of said vehicle. An output shaft concentric with the input shaft is provided, the output shaft is torsionally connected with the rear wheels of the vehicle. A shift collar to selectively connect said input shaft with said output shaft is provided. A shift fork is provided to translate the shift collar, the shift fork having a main body with a bore. A cylinder is connected with the housing. A piston is slidably mounted within said cylinder. A headed fastener is provided with a shank extending through the shift fork main body bore. The fastener head engages the shift fork, the fastener's shank being threadably engaged with the piston to capture the shift fork with the piston.

15 Claims, 7 Drawing Sheets (56) References Cited

U.S. PATENT DOCUMENTS

| | | | | |
|---|---|---|---|---|
| 2013/0085031 A1* | 4/2013 | Bassi | ............... | B60K 17/36 |
| | | | | 475/220 |
| 2014/0216189 A1* | 8/2014 | Anderson | ............ | B60K 17/344 |
| | | | | 74/335 |
| 2015/0011349 A1* | 1/2015 | Downs | ............... | B60K 17/35 |
| | | | | 475/198 |
| 2015/0027245 A1* | 1/2015 | Perakes | ............... | B60K 25/06 |
| | | | | 74/15.82 |
| 2015/0314679 A1* | 11/2015 | Rode | ............... | B60K 23/08 |
| | | | | 180/233 |
| 2016/0288642 A1* | 10/2016 | Rode | ............... | B60K 17/344 |

* cited by examiner

POWER TRANSFER UNIT (PTU) ASSEMBLY WITH CYLINDER

CROSS-REFERENCE TO RELATED APPLICATIONS

This application claims the benefit of U.S. Patent Application No. 62/153,657 filed on Apr. 28, 2015 and 62/158,947 filed on May 8, 2015, the disclosure of which is herein incorporated by reference in its entirety.

FIELD OF THE INVENTION

The present invention relates to arrangement of front wheel drive vehicles having transverse mounted engines with four wheel drive capabilities upon demand.

BACKGROUND OF THE INVENTION

To increase fuel economy, many vehicles have been switched over to front wheel drive so that the vehicle engine's weight can be over the main traction axle of a vehicle. To further increase fuel economy, many front wheel drive vehicles utilize a transverse mounted engine and transmission. To provide improved performance in inclement weather, many vehicles have selective four wheel drive capabilities. Typically in most front wheel drive vehicles with four wheel drive capability, the transmission powers a front differential. Torsionally downstream of the front differential is a power takeoff unit (PTU). The PTU couples the front differential with a prop shaft extending longitudinally to a rear axle and differential. To maximize fuel efficiency in selective four wheel drive vehicles, it is desirable to torsionally not only cut off the rear axle from the vehicle engine, but additionally causes the propeller (prop) shaft and most of the PTU to stop rotating. For quickest actuation/shift time for the demand of four wheel drive, the PTU requires some type of hydraulic actuation from a pressure source.

It is desirable from a cost standpoint to make the PTU fit as many vehicles as possible for a given manufacturer. Accordingly it is desirable to provide a PTU that can be hydraulically driven by different pressurized fluid sources. One source can be a hydraulic pump powered by an electrical system. Another embodiment can be an independent hydraulic pump driven by a belt off of an engine crankshaft. Still another embodiment can be the vehicle transmission pump, the power steering pump, or a pump driven by a gear on of the wheel axle. It is desirable to provide a PTU that is hydraulically powered that can be powered by a multitude of pressured fluid sources.

SUMMARY OF THE INVENTION

To make manifest the above noted desires and to provide other advantages, a revelation of the present invention is brought forth. The present invention brings forth an arrangement of a power takeoff unit for a vehicle having normal transverse engine/transmission normal two wheel drive operation which can be selectively placed into four wheel drive operation. The takeoff unit includes an input shaft supported in a housing, the input shaft is torsionally connected with a transmission of said vehicle. An output shaft concentric with the input shaft is provided, the output shaft is torsionally connected with the rear wheels of the vehicle. A shift collar to selectively connect said input shaft with said output shaft is provided. A shift fork is provided to translate the shift collar, the shift fork having a main body with a bore. A cylinder is connected with the housing. A piston is slidably mounted within said cylinder. A headed fastener is provided with a shank extending through the shift fork main body bore. The fastener head engages the shift fork. The fastener's shank being threadably engaged with the piston to capture the shift fork with the piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is an exploded view of the cylinder and shift fork shown in

FIG. 6.

DETAILED DESCRIPTION OF THE PREFERRED EMBODIMENTS

The following description of the preferred embodiment(s) is merely exemplary in nature and is in no way intended to limit the invention, its application, or uses.

Figure 1:
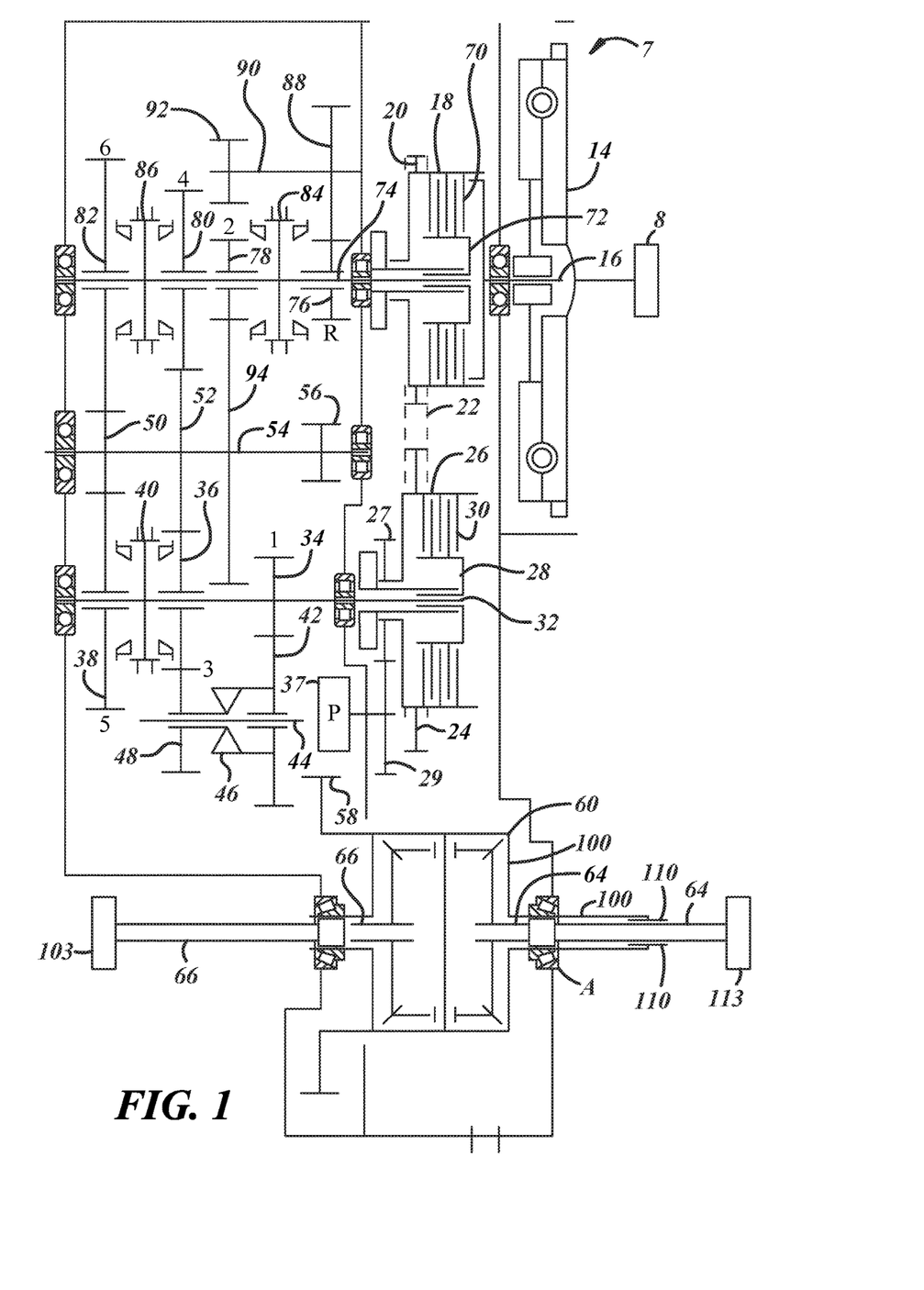
FIG. 1 is a schematic view of the transmission in the arrangement of an automotive passenger vehicle having normal front-wheel drive and selective four-wheel drive according to the present invention.
Figure 2:
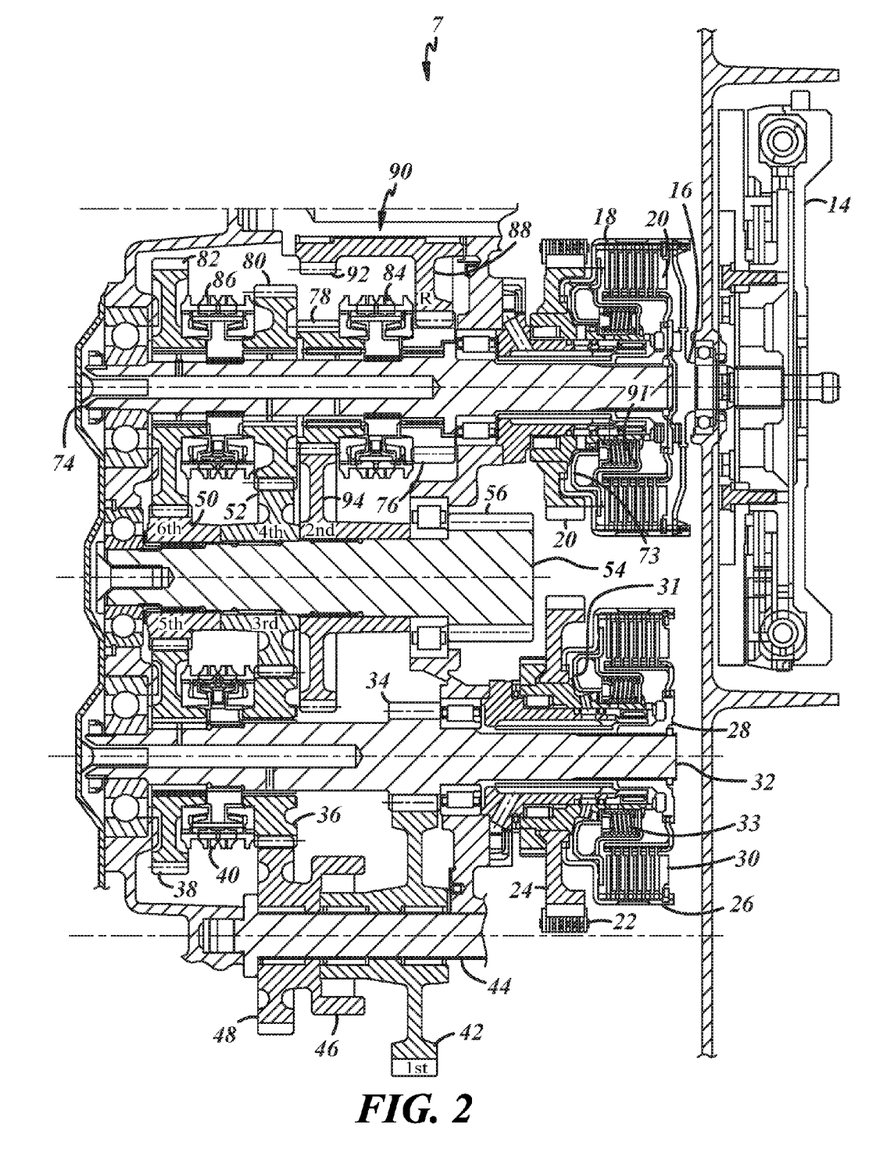
FIG. 2 is a sectional view of the transmission shown in FIG. 1.
Figure 3:
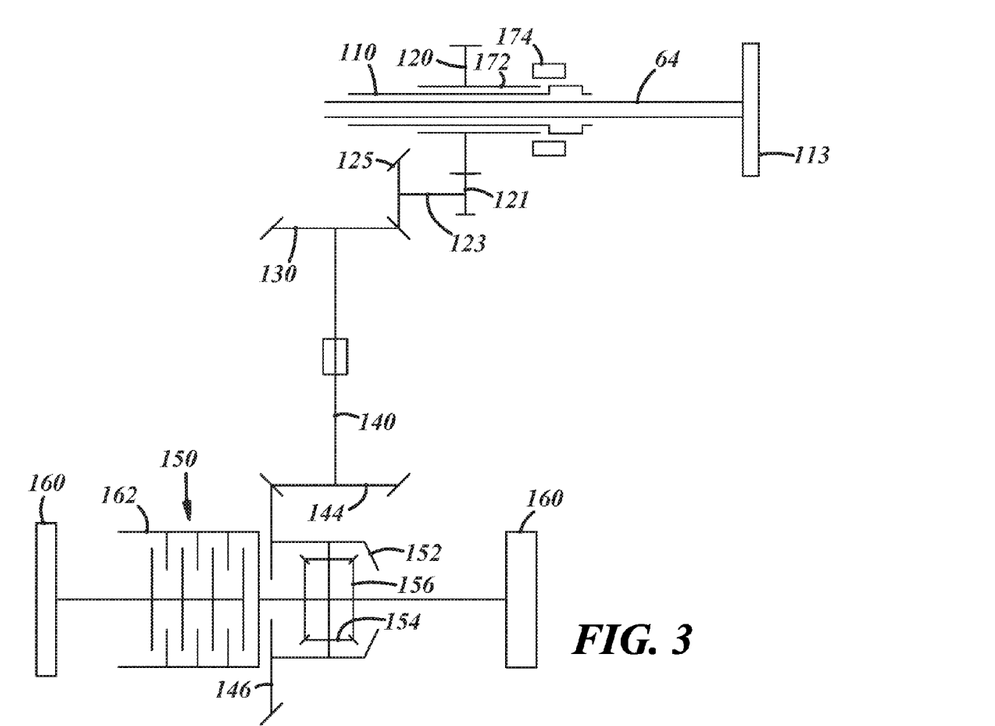
FIG. 3 is a schematic view of the remainder of a power train of the invention shown in FIGS. 1 and 2.

Referring to FIGS. 1, 2 and 3, a transverse mounted engine 8 of a normally front wheel drive selectively four wheel drive vehicle arrangement powers a six speed dual clutch transmission 7 of the present invention. The engine 8 typically will have a fly wheel connected with a damper 14. The damper is torsionally connected with a first clutch input shaft 16. The first clutch input shaft 16 is connected with a first clutch housing 18. The first clutch housing 18 is torsionally connected with a sprocket 20. The sprocket 20 is torsionally connected with a chain 22. The chain 22 is torsionally engaged with a second clutch housing sprocket 24. The second clutch housing sprocket 24 is fixably connected with a second clutch housing 26. The first clutch housing sprocket 20 has a diameter that is smaller than the diameter of the second housing sprocket 24; consequently, the first clutch housing 18 spins faster than the second clutch housing 26.

The second clutch housing 26 is selectively connected with a hub 28 via a friction pack 30. The housing 26 also has a gear that powers an output gear 29 powering a lubrication and transmission pressure activation oil pump 37. A clutch actuator piston 31 is provided to engage the friction pack 30 with the hub 28. The hub 28 is torsionally connected with a second input shaft 32. The second input shaft 32 has torsionally affixed thereto, a first gear ratio input gear 34. The second input shaft 32 also has rotatably mounted thereon third gear ratio input gear 36 and fifth gear ratio input gear 38. To torsionally selectively connect the fifth input gear 38 or the third input gear 36 with the second input shaft 32, there is provided a fifth/third synchronizer 40.

The first input gear 34 is continually meshed with an idler gear input gear 42. The idler gear input gear 42 is rotatably mounted on an idler shaft 44. The idler shaft input gear 42 is torsionally connected via a one-way clutch 46 with an idler shaft output gear 48. The idler shaft output gear 48 is in continual mesh with the third input gear 36.

Fifth input gear 38 is in mesh with a fifth output gear 50. Third input gear 36 is meshed with a third output gear 52. Output gears 50 and 52 are torsionally affixed to an output shaft 54. Output shaft 54 also has torsionally affixed thereto a final drive pinion 56. Final drive pinion 56 is meshed with a differential input gear 58. Differential input gear 58 is a ring gear which is connected with a front differential casing 60 (sometimes referred to as a housing) which in turn drives two axial shafts 64 and 66. In other embodiments, (not shown), the transmission can have dual output shafts similar to that shown in "DCT TRANSMISSION UTILIZING TWO AXIS CHAIN", U.S. Pat. No 8,342,051 filed Jun. 29, 2009, to Pritchard et al.

The first clutch housing 18 via a friction pack 70 is selectively torsionally engaged with a hub 72 which is splined to a first input shaft 74. The first input shaft 74 rotatably mounts a reverse drive input gear 76, a second gear ratio input gear 78, a fourth gear ratio input gear 80 and a sixth gear ratio input gear 82. The reverse drive or input gear 76 is in a bisecting coaxial plane of the final drive pinion 56. To torsionally affix the reverse input gear 76 or the second input gear 78 with the first input shaft 74, there is provided a second/reverse synchronizer actuator 84. To torsionally connect the sixth input gear 82 or the fourth gear ratio input gear 80 with the first input shaft 74, there is provided a sixth fourth synchronizer 86. The reverse input gear 76 is continually meshed with a reverse idler shaft input gear 88 which is in turn torsionally connected via reverse idler shaft 90 with a reverse idler shaft output gear 92 which meshes with a second output gear 94. Gear 50 also serves as an output gear for sixth input gear 82. Gear 52 also functions as an output gear for the fourth input gear 80.

The front differential 60 casing 100 via a spline connection is torsionally connected with a PTU input shaft 110. The front differential also has a side gear connected with a wheel shaft 64. The wheel shaft 64 is connected via a half shaft (not shown) with a wheel 113. The wheel shaft 64 extends through the PTU input shaft 110. On the opposite side of the front differential 60 is a wheel shaft 66 which via a half shaft (not shown) is connected with a wheel 103.

Figure 4:
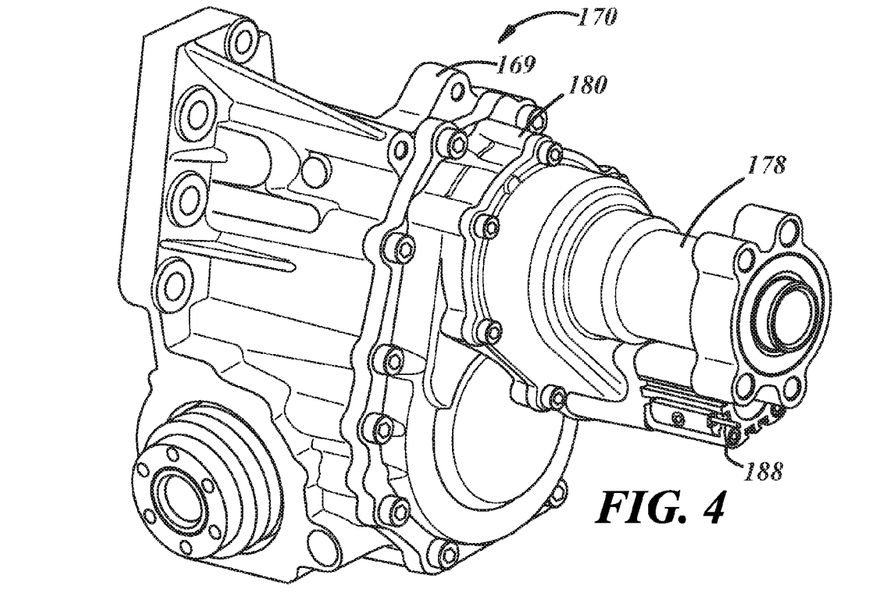
FIG. 4 is a perspective view of a power take off unit utilized in the arrangement of the present invention.
Figure 5:
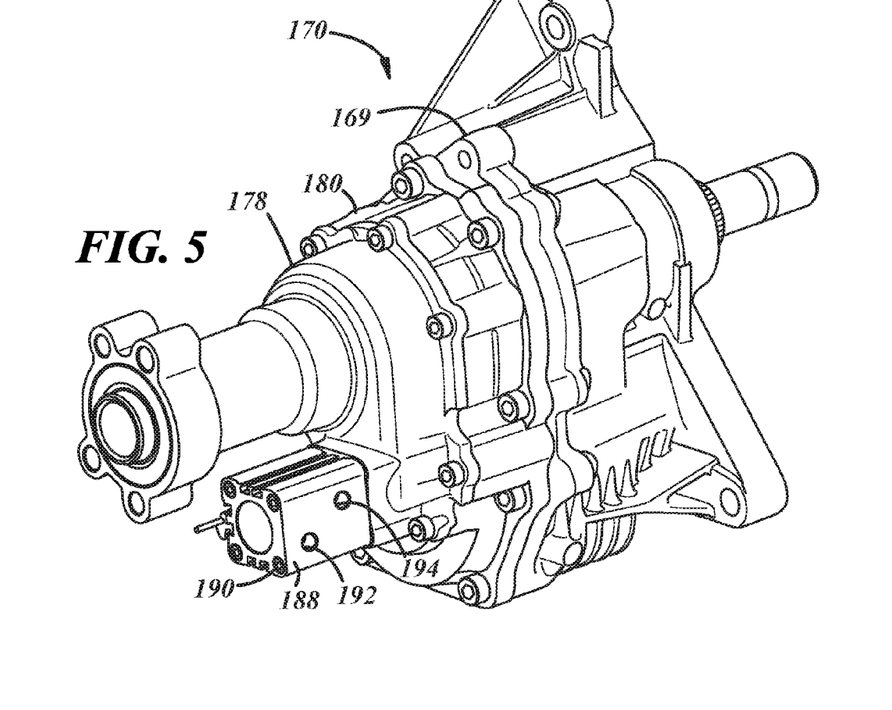
FIG. 5 is another perspective view of a power take off unit utilized in the arrangement of the present invention an actuator of the present invention.
Figure 6:
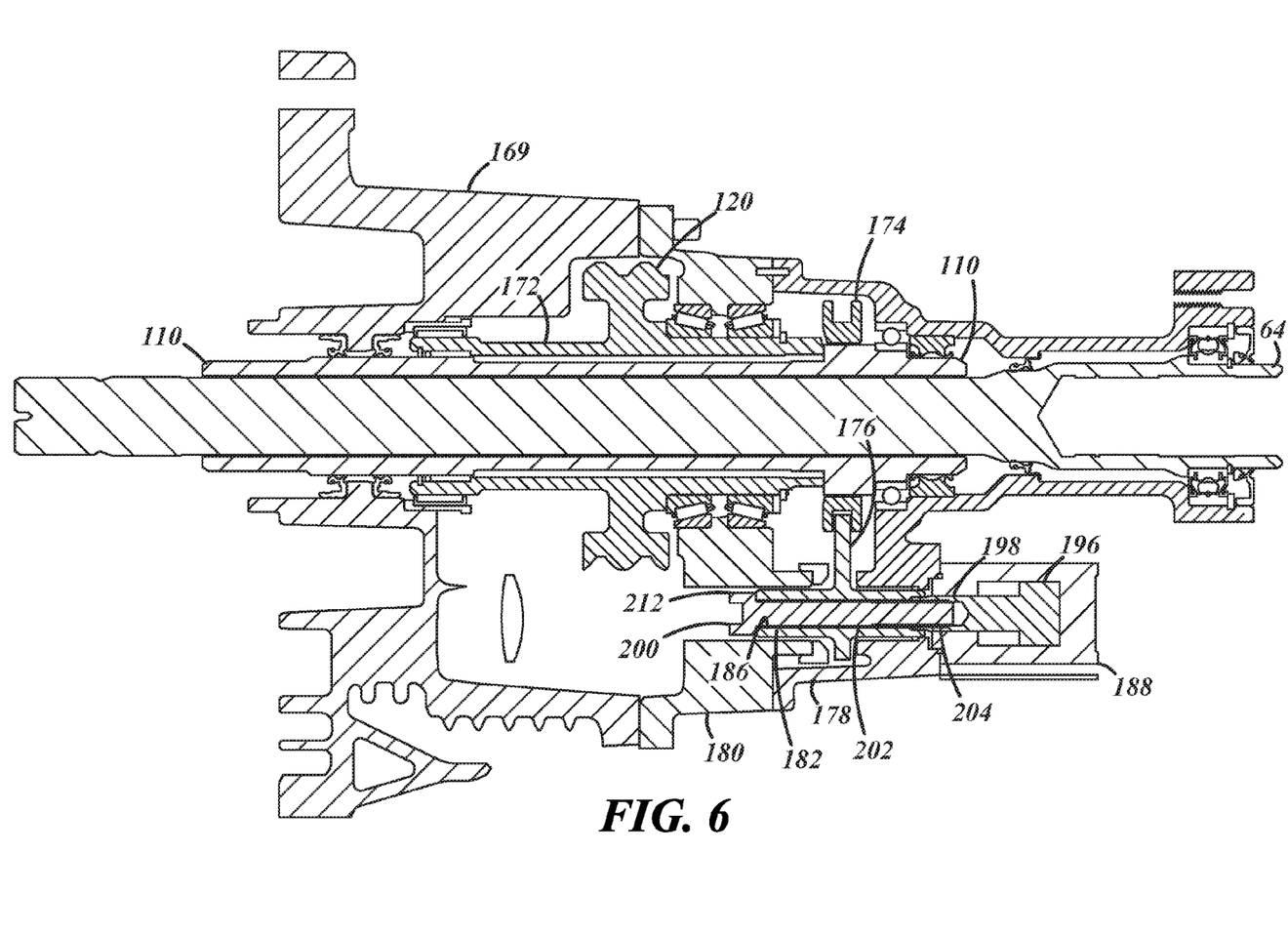
FIG. 6. is a sectional view of a power take off unit utilized in the arrangement of the present invention.
Figure 7:
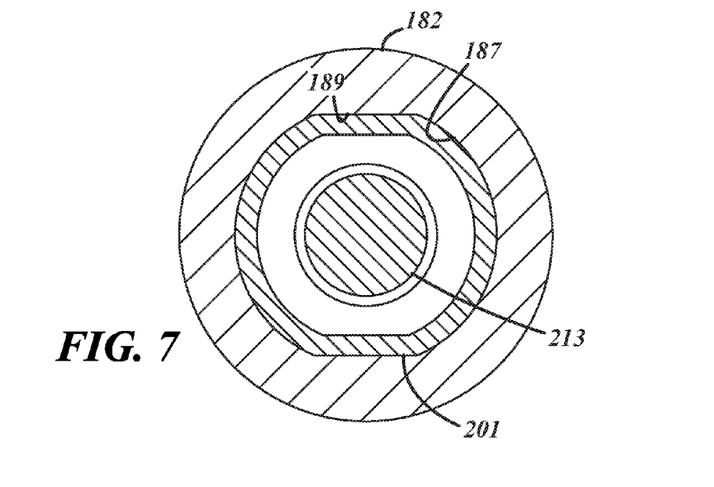
FIG. 7 is a section view taken along lines 7-7 of FIG. 8.

Referring additionally to FIGS. 4-6, the casing 100 of the front differential in a manner similar to transmission 7 extends transversely to a main axis of the vehicle. Rotatably mounted on the PTU input shaft is a rear axle input gear shaft 172. A rear axle input gear 120 is integrally connected on a rear axle input gear shaft 172. The rear axle input gear 120 meshes with gear 121 (FIG. 3). Gear 121 rotates shaft 123 and gear 125. Gear 125 is torsionally connected with a prop shaft input gear 130. Prop shaft input gear 130 is connected with a longitudinally rearward extending prop shaft 140. The prop shaft 140 may be a single elongated member or a plurality of members joined by universal joints.

The end of the prop shaft 140 has connected thereto an output gear 144. The output gear 144 is torsionally connected with a ring gear 146 of a rear axle differential 150. Rear differential 150 has a casing 152 with drive gears 154. Drive gears 154 mesh with side gears 156. Side gears 156 are connected with rear wheel shafts 158 which are in turn connected with rear wheels 160. In a first state of operation the rear axle differential 150 differentially powers the rear wheels 160. The rear axle differential 150 has a clutch 162 which can selectively couple the side gears 156 of the rear differential with the rear wheels 160. When the clutch 162 is open, the ring gear 146 and the casing 152 and prop shaft output gear 144 and prop shaft 140 do not have rotational movement. However, the rear wheels 160 will rotate upon any movement of the vehicle even though the rear wheels 160 are unpowered. Rear axle differential 150 in a second state of operation wherein the clutch 162 is open, the wheels 160 are non-driven and can freewheel with respect to one another.

The PTU input shaft 110 is rotatably supported on a three-part bolt connected PTU housing 170. The PTU housing has an inner part 169. The PTU input shaft 110 is torsionally connected with the transmission 7 of the vehicle. The PTU input shaft 110 is selectively connected with the PTU output shaft 172. The shaft 120 is concentric with shaft 110. A shift collar 174 is provided to selectively connect the shaft 110 with the shaft 172.

A shift fork 176 is provided to translate the shift collar 174. The shift fork 176 is slidably mounted in an outer 178 and a middle 180 portions of the PTU housing 120. The shift fork 176 has a main body 182. The shift fork main body 182 slides within axially aligned journal bearings 184 is provided within PTU housing portions 178 and 180. A bumper 183 limits travel of the shift fork. The shift fork main body has a bore 186 that is generally parallel with the shaft 110. Bore 186 has a shoulder 185 and an enlarged diameter portion 187 with opposing internal flats 189.

Figure 8:
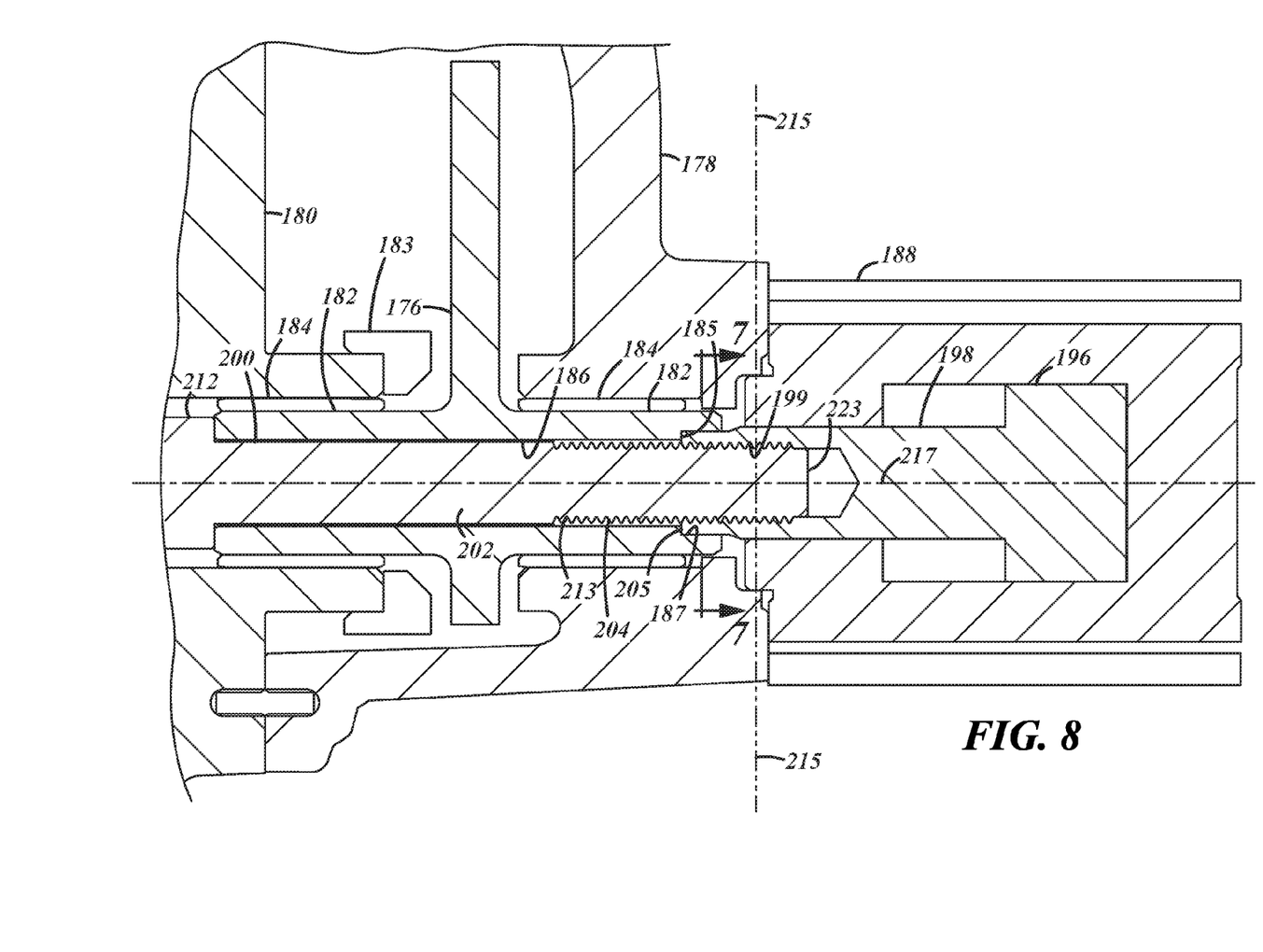
FIG. 8 is an enlarged view of a portion of FIG. 6.
Figure 9:
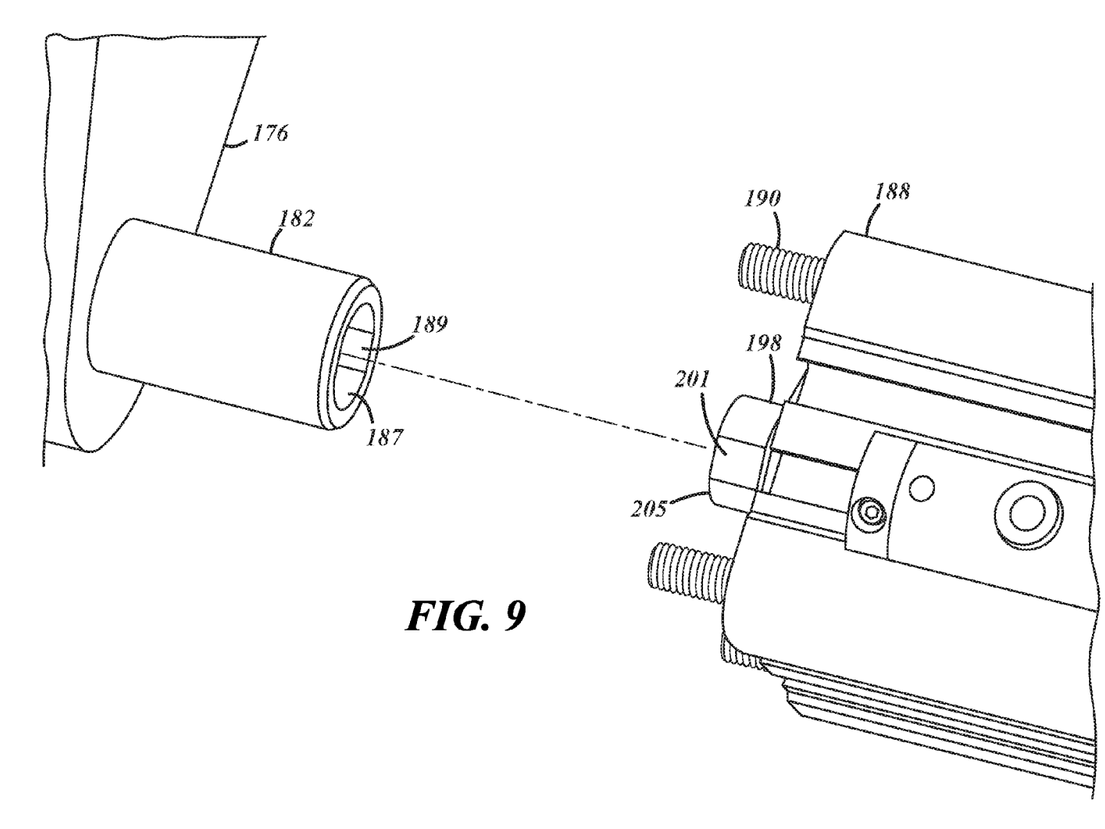

A piston cylinder 188 is connected with the outer housing portion 178 by four bolts 190. The piston cylinder 188 has hydraulic ports 192 and 194. Slidably mounted in the piston cylinder 188 is a piston 196 having a rod 198. The piston rod 198 has a threaded bore 199. A reduced diameter portion of the piston rod 198 has opposing flats 201 that match with shift fork flats 189 to provide a non-rotative connection of the shift fork 176 with the piston 196. As shown in FIG. 6, port 192 fluidly connects with the cylinder to the right of the piston 196. Port 194 fluidly connects with the cylinder 188 to the left of the piston 196. A threaded fastener 200 has a shank 202 that extends through the main body bore 186 of the shift fork. The fastener shank 202 has a threaded portion 204 that threadably engages the threaded bore 199 provided in the piston rod. An extreme end 205 of the piston rod has its insertion into the bore of the shift fork limited by the shift fork bore shoulder 185. To make a non-rotative connection of the shift fork with the piston 196, the piston rod 198 is first aligned with the shift fork 176 and the non-rotative connection between the shift fork 176 and the piston rod 198 is made.

To axially connect the shift fork 176 with the piston 196 the shank 202 of the fastener is inserted into the shift fork bore 186. As the fastener is torqued, a threaded portion 213 of the shank 204 is threadably connected with the piston rod. A head 212 of the fastener captures the shift fork 176 to the piston 196. An extreme end 223 of the fastener extends into the cylinder 188 and a plane 215 perpendicular to an axis 217 of the fastener intersects the piston rod 198, piston cylinder 188 and housing portion 178. The shift fork 176 is connected with the piston 196 after the cylinder 188 is connected with the PTU housing 170, while at the same time connecting the shift fork 176 with the piston 196 from an interior side of the PTU housing 170. Multiple pressured hydraulic sources can be utilize to power the PTU including but not limited to an electric pumps or various hydraulic pressurized fluid supply sources such as the power steering pump or a pump powered by a gear mounted on the half shaft 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power takeoff unit for an automotive vehicle being a normally front-wheel drive vehicle and convertible to an all-wheel drive vehicle comprising:
    an input shaft supported in a housing, said input shaft being torsionally connected with a transmission of said vehicle;
    an output shaft concentric with said input shaft, said output shaft being torsionally connected with rear wheels of said vehicle;
    a shift collar to selectively connect said input shaft with said output shaft;
    a shift fork to translate said shift collar, said shift fork being slidably mounted in said housing and said shift fork having a main body with a bore generally parallel with said input shaft;
    a cylinder connected with said housing;
    a piston slidably mounted within said cylinder; and
    a headed fastener with a shank extending through said shift fork main body bore, said fastener head engaging an end of said shift fork and said fastener shank being threadably engaged with said piston to capture said shift fork with said piston.

2. The power takeoff unit of claim 1 wherein a portion of said piston is non-rotatively connected with said shift fork.

3. The power takeoff unit of claim 1 wherein said piston is connected with a rod.

4. The power takeoff unit of claim 2 wherein a portion of said piston rod is inserted within said shift fork.

5. The power takeoff unit of claim 4 wherein a portion of said piston rod inserted within said shift fork has a flat matching an internal flat of the shift fork.

6. The power takeoff unit of claim 5 wherein a portion of said piston rod has multiple flats corresponding with multiple flats of said shift fork.

7. The power takeoff unit of claim 1 wherein a main body of said shift fork is mounted within a journal bearing in said housing.

8. The power takeoff unit of claim 1 wherein a main body of said shift fork is mounted within multiple axially aligned journal bearings in said housing.

9. The power takeoff unit of claim 1 wherein there is a bumper to limit travel of said shift fork.

10. The power takeoff unit of claim 4 wherein said shift fork bore has a shoulder to limit insertion of said piston rod.

11. The power takeoff unit of claim 3 wherein said shank of said threaded fastener is threadably engaged with a threaded bore of said piston rod.

12. The power takeoff unit of claim 11 wherein said shank of said threaded fastener is threadably engaged with a threaded bore of said piston rod to a point wherein said shank is within said cylinder.

13. The power takeoff unit of claim 3 wherein said shank of said threaded fastener is threadably engaged with a threaded bore of said piston rod to a point wherein said shank is within said cylinder and a plane perpendicular to an axis of a portion of said shank intersects said piston rod, said cylinder and said housing.

14. A power takeoff unit for an automotive vehicle being a normally front-wheel drive vehicle and convertible to an all-wheel drive vehicle comprising:
    an input shaft supported in a housing, said input shaft being torsionally connected with a transmission of said vehicle;
    an output shaft concentric with said input shaft, said output shaft being torsionally connected with rear wheels of said vehicle;
    a shift collar to selectively connect said input shaft with said output shaft;
    a shift fork to translate said shift collar, said shift fork having a main body, said shift fork main body being slidably mounted within said housing by axially aligned journal bearings mounted within said housing, and said shift fork main body having a bore generally parallel with said input shaft, said bore having a portion with opposing flats and a shoulder;
    a cylinder connected with said housing;
    a piston with a connected rod slidably mounted within said cylinder, said piston rod having opposing flats received with said shift fork bore flats and said piston rod being inserted within said shift fork having an end abutting said bore shoulder, and said piston rod having a threaded bore; and
    a headed fastener with a shank extending through said shift fork main body bore, said fastener head engaging an end of said shift fork and said fastener shank being threadably engaged within said threaded bore of said piston rod bore to capture said shift fork with said piston.

15. A method of connecting a shift collar and a piston of power takeoff unit for an automotive vehicle being a normally front-wheel drive vehicle and convertible to an all-wheel drive vehicle comprising:
    providing an input shaft supported in a housing, said input shaft being torsionally connected with a transmission of said vehicle;
    providing an output shaft concentric with said input shaft, said output shaft being torsionally connected with rear wheels of said vehicle;
    providing said shift collar to selectively connect said input shaft with said output shaft;
    providing a shift fork to translate said shift collar, said shift fork being slidably mounted in said housing and said shift fork having a main body with a bore generally parallel with said input shaft;
    providing a cylinder connected with said housing on a first side of said housing;
    providing a piston slidably mounted within said cylinder;
    providing a headed fastener from a second side of said housing generally opposite of said first side;
    extending through said shift fork main body bore a shank of said fastener, said fastener; and
    engaging an end of said shift fork with said fastener head and torqueing fastener shank thereby threadably engaging said fastener shank with said piston and thereby capturing said shift fork with said piston.

\* \* \* \* \*